(12) United States Patent
Beck et al.

(10) Patent No.: US 7,415,821 B2
(45) Date of Patent: Aug. 26, 2008

(54) HYDRAULIC MOTOR UNIT

(75) Inventors: Jochen Beck, deceased, late of Ulm (DE); by Ulrich Heinz, legal representative, Elchingen (DE); Werner Hoermann, Illertissen (DE); Massao Umeda, Tsuchiura (JP)

(73) Assignee: Brueninghaus Hydromatik GmbH, Elchingen (DE)

( * ) Notice: Subject to any disclaimer, the term of this patent is extended or adjusted under 35 U.S.C. 154(b) by 78 days.

(21) Appl. No.: 10/513,363

(22) PCT Filed: Apr. 24, 2003

(86) PCT No.: PCT/EP03/04282

§ 371 (c)(1),
(2), (4) Date: Aug. 24, 2006

(87) PCT Pub. No.: WO03/093702

PCT Pub. Date: Nov. 13, 2003

(65) Prior Publication Data

US 2007/0000245 A1    Jan. 4, 2007

(30) Foreign Application Priority Data

May 3, 2002    (DE) ................... 102 19 849

(51) Int. Cl.
*F16H 61/42*    (2006.01)
*F04B 49/00*    (2006.01)

(52) U.S. Cl. .......................... 60/445; 60/487

(58) Field of Classification Search ............. 60/445, 60/487
See application file for complete search history.

(56) References Cited

U.S. PATENT DOCUMENTS

| 3,854,847 | A |   | 12/1974 | Schlecht |
| 5,203,168 | A | * | 4/1993 | Oshina et al. ............... 60/488 |
| 5,907,952 | A | * | 6/1999 | Akasaka et al. ............. 60/445 |

(Continued)

FOREIGN PATENT DOCUMENTS

DE    42 34 826 C1    10/1992

(Continued)

OTHER PUBLICATIONS

"Verstellmotor A6VM", RD 91 604/05.99, *Mannesmann Rexroth Engineering*, (Brueninghaus Hydromatik), pp. 1-40.

*Primary Examiner*—Thomas E Lazo
(74) *Attorney, Agent, or Firm*—Scully, Scott, Murphy & Presser, P.C.

(57) ABSTRACT

A hydraulic motor unit including a hydraulic motor (1') which is connected to two working lines (3,4). The swiveling angle ($\alpha$) of the hydraulic motor (1') is adjustable by an adjusting unit (7) which is provided with a regulating piston (8) having two piston surfaces (9, 10). The regulation pressure acting on a first piston surface (10) in a regulation pressure chamber (12) can be adjusted by a control valve (13). The control valve (13) adjusting the regulation pressure is movable between two final positions. The pressure of a working line (3, 4) is applied to a first measuring surface (23) of the control valve (13) adjusting the regulation pressure while a second, opposite measuring surface (25) of the control valve (13) is impinged upon by a control pressure piston (34) at a force that depends on the control pressure only once a threshold value of a pipe (28, 18') supplying control pressure has been exceeded.

11 Claims, 2 Drawing Sheets

Figure 3:
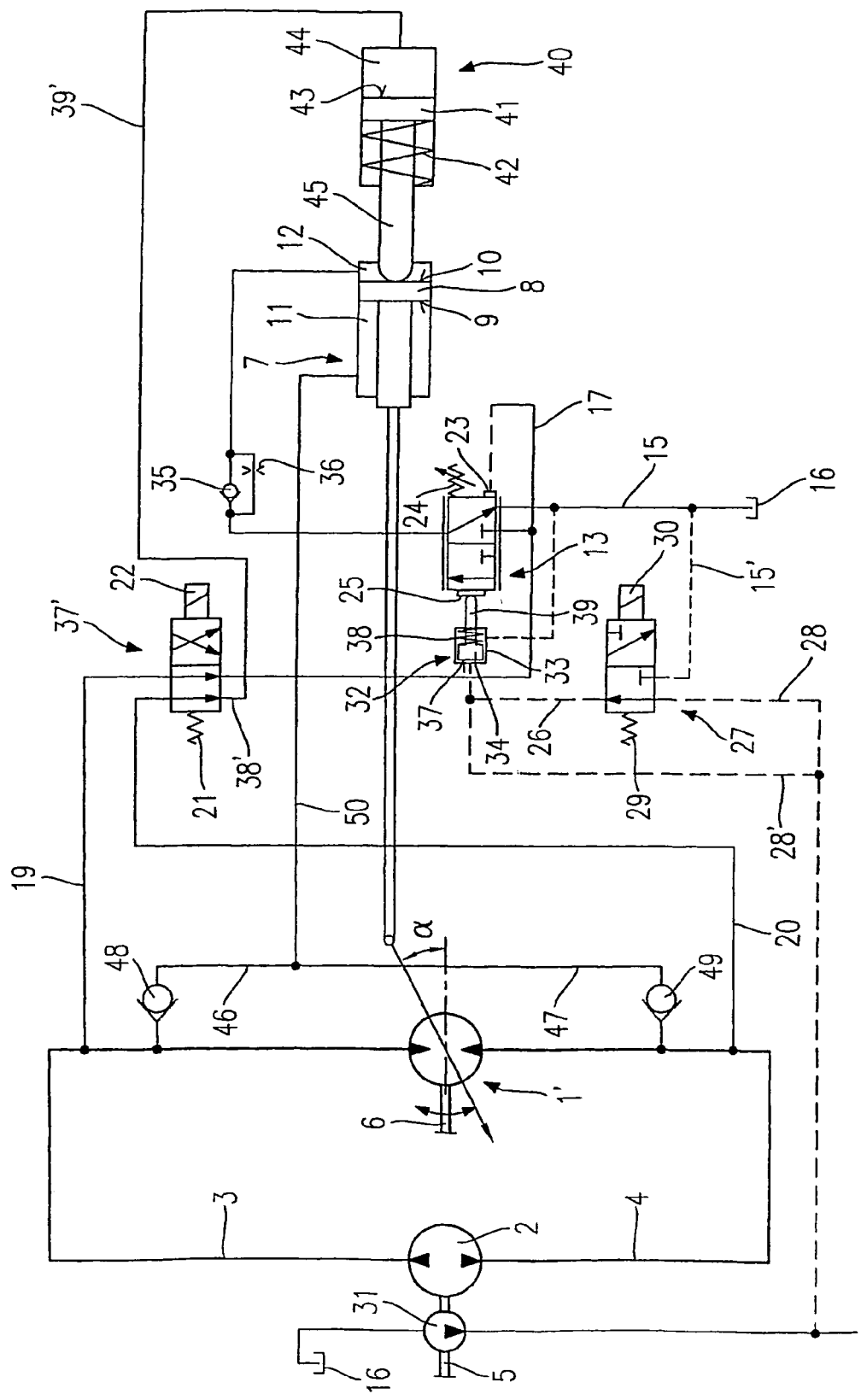

U.S. PATENT DOCUMENTS 6,351,945 B1 * 3/2002 Stickel ..................... 60/445
7,163,078 B2 * 1/2007 Moya et al. ................ 180/308

FOREIGN PATENT DOCUMENTS

| | | |
|---|---|---|
| DE | 43 07 002 A1 | 3/1993 |
| DE | 44 20 704 A1 | 6/1994 |
| DE | 198 50 162 C1 | 10/1998 |
| EP | 0 467 440 A1 | 7/1991 |
| JP | 63-266201 | 11/1988 |
| JP | 3-113168 | 5/1991 |
| JP | 4-370403 | 12/1992 |
| JP | 11-166623 | 6/1999 |
| WO | WO 00/26563 | 10/1999 |

* cited by examiner

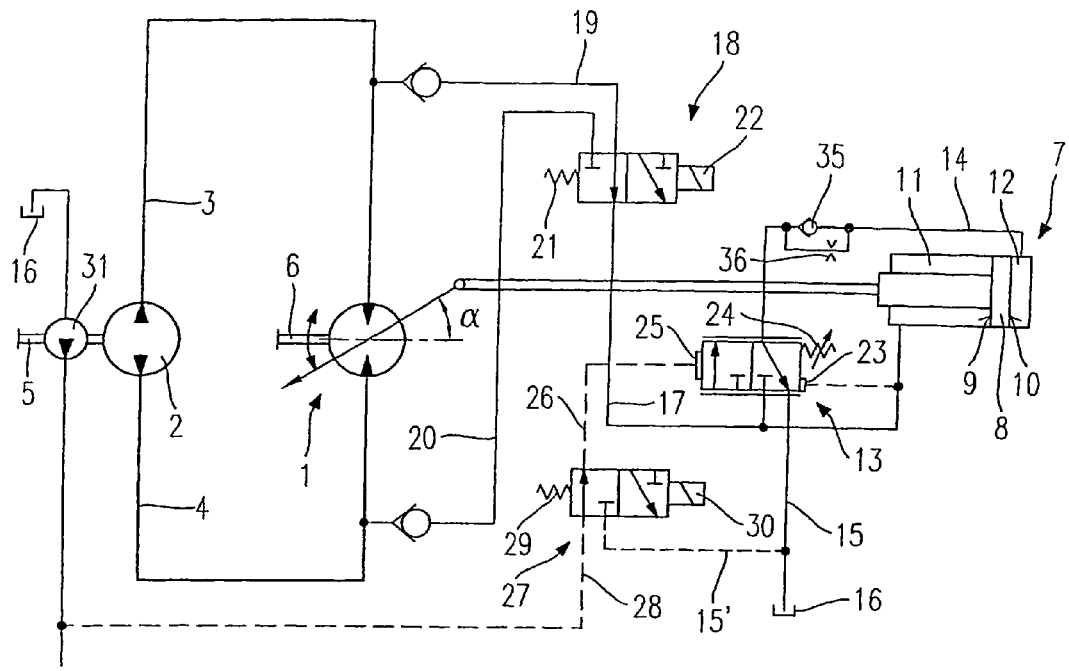
Fig. 1  (state of the art)
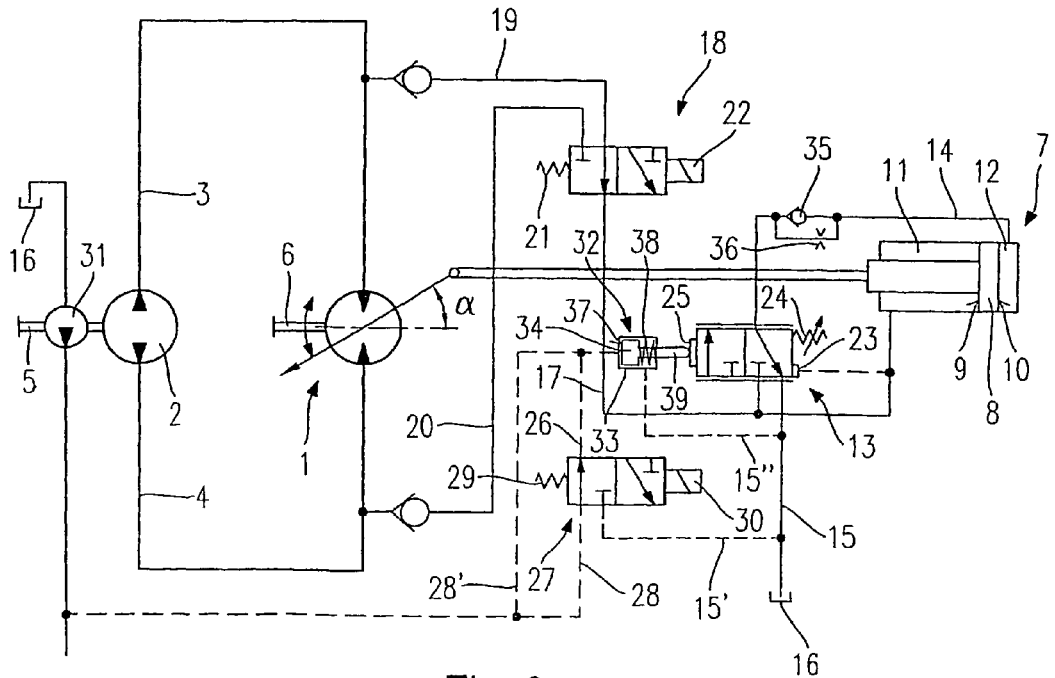
Fig. 2

HYDRAULIC MOTOR UNIT

The invention relates to a hydraulic motor according to the type specified in the main claim.

Adjustable hydraulic motors which are connected via hydraulic working lines to a hydraulic pump which in turn is driven by, for example, a diesel engine are used, for example, in hydrostatic crawler drives. Hydraulic motors that are controlled in speed-dependent or high-pressure-dependent manner are conventionally employed in such drives.

The basic circuit represented in FIG. 1 is known from the brochure entitled "Verstellmotor A6VM, RD 91604/05.99", page 8/40, dating from 1999 and produced by the applicant. The setting of the swash-plate angle of the hydraulic motor is performed in this case by an adjusting device in which an actuating piston is arranged, the opposite piston faces of which can be loaded by pressures of a cylinder chamber and of an actuating-pressure chamber. For this purpose the pressure medium is withdrawn via a driving-direction valve pertaining in each instance to the delivery-side working line— that is to say, in a manner depending on the driving direction. The pressure chamber of the adjusting device is pressurised with the pressure of the delivery-side working line via the driving-direction valve. In the opposite direction an actuating pressure, which is capable of being set via an actuating-pressure regulating valve in an actuating-pressure chamber, acts on the actuating piston. In the configuration represented, which is regulated in speed-dependent manner, a control-pressure switching valve is additionally arranged in the control-pressure supply line leading to the actuating-pressure regulating valve.

The known embodiment of a hydraulic motor unit has the disadvantage that in the course of the start-up procedure, already at low speeds of the diesel engine, the swash-plate angle of the hydraulic motor is adjusted in the direction of smaller swash-plate angles by the rising pressure which is generated in the control-pressure line by the-auxiliary pump.

Furthermore, with diminishing speed of the drive motor the hydraulic motor is adjusted in its swash-plate angle in such a way that scarcely any braking power or only slight braking power is possible. There is in fact the possibility of forcing the maximum swash-plate angle of the hydraulic motor via a control-pressure switching valve. When braking or when travelling downhill, this results in an undesirable stop-and-go effect, since with the aid of the high braking power at maximum swash-plate angle of the hydraulic motor the vehicle is decelerated to such an extent until the control system comes into action and accelerates the vehicle again. As a result of the repeated deceleration and acceleration it is not possible for a stable running condition to be obtained.

The object underlying the invention is therefore to create a hydraulic motor unit in which an improved starting behaviour and also a sufficient braking power are generated by limiting the control range for an adjustment of the swash-plate angle of the hydraulic motor.

The object is achieved by the hydraulic motor unit according to the invention as specified in claim 1.

In order to leave the hydraulic motor at a large swash-plate angle during the start-up procedure, the force generated by an auxiliary pump on a control-pressure piston is transmitted to a measuring surface of the actuating-pressure regulating valve. In this connection the control-pressure piston generating the force acting on the measuring surface is held in its initial position by a spring until the control pressure acting on the control-pressure piston is great enough to overcome the force of the spring. As a result, the commencement of the control process during the rising pressure of the auxiliary pump in the course of the start-up procedure is delayed. The modified commencement of the control process brings about a modified termination of the control process at the same time, so that in the course of retarding the vehicle the actuating piston is adjusted in the direction of maximum swash-plate angle, since the diminishing control pressure of the auxiliary pump is no longer transmitted to the measuring surface of the actuating-pressure regulating valve as soon as the limiting value determined by the restoring spring is fallen short of and consequently the actuating piston adjusts the hydraulic motor in the direction of large swash-plate angles, so that a sufficient braking power can be generated.

Advantageous further developments of the hydraulic motor unit according to the invention are possible with the measures specified in the dependent claims.

In particular it is advantageous that, by virtue of the stroke limitation in conjunction with a multi-way driving-direction valve, also in the event of sudden inversion of the pressure ratio and a large pressure differential in the working lines the swash-plate angle of the hydraulic motor is set to a mean value, and a defined running condition with sufficient braking power is thereby obtained.

On the basis of the following drawings, firstly the state of the art and subsequently two exemplary embodiments of hydraulic motor units according to the invention will be described. Shown are:

FIG. 1 a hydraulic circuit diagram of a hydraulic motor which is controlled in speed-dependent manner in accordance with the state of the art;

FIG. 2 a hydraulic circuit diagram of a first hydraulic motor unit according to the invention with speed-dependent control; and FIG. 3 a hydraulic circuit diagram of a second hydraulic motor unit according to the invention with speed-dependent control and stroke limitation.

A hydraulic circuit diagram of a hydraulic motor unit with a hydraulic motor 1 according to the state of the art is represented in FIG. 1. The hydraulic motor 1 is capable of being connected to a hydraulic pump 2 via working lines 3 and 4. The hydraulic pump 2 is driven via a prime mover which is not represented and to which it is connected via a shaft 5. The hydraulic pump 2 is designed for delivery in both directions.

Via a drive shaft 6 the hydraulic motor 1 drives, for example, a wheel drive or a slewing mechanism of an excavator. The displacement of the hydraulic motor 1 is capable of being adjusted via a swash-plate angle $\alpha$. The setting of the swash-plate angle $\alpha$ is undertaken with the aid of an adjusting device 7. The adjusting device 7 comprises an actuating piston 8 with two oppositely directed piston faces 9 and 10, so that a force acts on the actuating piston 8 by virtue of the pressures prevailing in a cylinder chamber 11 and in an actuating-pressure chamber 12. The pressure ratio between the cylinder chamber 11 and the actuating-pressure chamber 12 is capable of being set by the actuating pressure in the actuating-pressure chamber 12 by means of an actuating-pressure regulating valve 13.

In a first end position the actuating-pressure regulating valve 13 connects an actuating-pressure line 14 to a tank 16 via a relief line 15. In its second end position the actuating-pressure line 14 is connected to a working-pressure line 17 by means of the actuating-pressure regulating valve 13.

Via a driving-direction valve 18 constructed as a switching valve the working-pressure line 17 is connected in a first switching position to the working line 3 via a first supply line 19 and is connected in the second switching position of the driving-direction valve 18 to the working line 4 via a second supply line 20. A first switching position of the driving-direction valve 18 is predetermined by a compression spring 21. When current is supplied to an electromagnet 22, the driving-direction valve 18 is brought into its second switching position.

The switching position of the driving-direction valve 18 is predetermined in each instance by the delivery direction of the hydraulic pump 2. As a result, the working line 3 or 4, which is respectively on the delivery side or loaded with high pressure, is connected to the working-pressure line 17. Consequently the pressure that prevails in the delivery-side working line 3 or 4 is always present in the cylinder chamber 11.

The setting of the swash-plate angle α is undertaken by a resultant force on the actuating piston 8. For this purpose the actuating-pressure regulating valve 13 may assume any intermediate position between its end positions. In the actuating-pressure chamber 12 an actuating pressure is therefore capable of being set which lies between the pressure of the tank 16 and the pressure in the working-pressure line 17. Arranged in the actuating-pressure line 14 is a check valve 35 which opens in a manner contrary to the direction of the actuating-pressure regulating valve 13. A throttle 36 is formed parallel thereto.

For the purpose of setting the position of the actuating-pressure regulating valve 13, the pressure in the working-pressure line 17 acts on a first measuring surface 23. A force of a compression spring 24, which is constructed so as to be adjustable, acts in the same direction. In the opposite direction a control pressure of the control-pressure line 26 acts on a second measuring surface 25. The control-pressure line 26 is capable of being connected via a switching valve 27 to a control-pressure supply line 28 or, upon actuation of an electromagnet 30 acting contrary to a compression spring 29, to a relief line 15'. As a result, either a pressure that is present in the control-pressure supply line 28 or the pressure of the tank volume 16 is effective on the second measuring surface 25. The pressure that is available in the control-pressure supply line 28 is speed-dependent and is generated by an auxiliary pump 31 which is driven via the shaft 5. The auxiliary pump 31 is constructed as a constant-flow pump, so that the pressure that is built up in the control-pressure supply line 28 is approximately proportional to the speed of the pump 2 or of the drive motor, which is not represented.

The control according to the invention of the actuating-pressure regulating valve 13 of a hydraulic motor 1' is represented in FIG. 2. Instead of the direct loading of the second measuring surface 25 by a control pressure of the control-pressure supply line 28, a control-pressure cylinder 32 is provided for the purpose of transmitting the control-pressure force to the second measuring surface 25. The control-pressure cylinder 32 has a housing 33 in which a control-pressure piston 34 is arranged. The control-pressure piston 34 is orientated with a piston face 37 towards the port of the control-pressure supply line 28. In the control-pressure volume enclosed by the control-pressure piston 34 and the housing 33 the same pressure prevails as in the control-pressure supply line 28'. The control-pressure chamber can be relieved into the tank volume 16 upon actuation of the switching valve 27.

The control-pressure piston 34 is held in its initial position by a restoring spring 38 taking the form of a compression spring, so that the control-pressure volume enclosed by the control-pressure piston 34 and the housing 33 is minimal. On its side facing away from the piston face 37 a valve lifter 39 is arranged on the control-pressure piston 34, which in the case of minimal control-pressure volume has a slight spacing from the second measuring surface 25 of the actuating-pressure regulating valve 13. If the piston face 37 is loaded with a control pressure via the control-pressure supply line 28 or 28', the control-pressure piston 34 moves into a position in which an equilibrium of forces arises between the hydraulic force acting on the piston face 37 and the opposite force of the restoring spring 38. As a result, by selection of a restoring spring 38 with an appropriate spring constant it is possible for that control pressure to be set at which the control-pressure piston 34 is displaced so far in the direction of the second measuring surface 25 until the valve lifter 39 is able to transmit force to said measuring surface. If the control pressure continues to rise, for example as a result of increasing the speed of the drive shaft 5 and thereby of the auxiliary pump 31, then the force generated thereby on the control-pressure piston 34 is transmitted to the second measuring surface 25 of the actuating-pressure regulating valve 13, and the actuating-pressure regulating valve 13 is deflected in the direction of its second end position.

As already explained with reference to FIG. 1, a displacement of the actuating-pressure regulating valve 13 in the direction of its second end position signifies a loading of the piston face 10 of the actuating piston 8 as a result of pressurising the actuating-pressure chamber 12 and hence an adjustment of the swash-plate angle of the hydraulic motor 1' in the direction of a smaller displacement. Instead of the selection of the restoring spring 38 on the basis of its spring constant, it is also possible to influence the commencement of the control process through the use of washers, with the aid of which the bias of the restoring spring 38 is capable of being set.

During the start-up procedure the hydraulic motor 1', which is pressureless to begin with, is at maximum swash-plate angle α. As a result, the transmission of a large torque is possible for the purpose of starting up. During the start-up procedure the speed of the prime mover, which is not represented, is increased, as a result of which both the hydraulic pump 2 and the auxiliary pump 31 increase their output via the drive shaft 5. In the switching position of the driving-direction valve 18 which is shown, the hydraulic pump 2 delivers into the working line 3. Via the first supply line 19, the driving-direction valve 18 and also the connecting line 17 attached thereto, the cylinder chamber 11 is loaded with the pressure of the working line 3 in the same way as the first measuring surface 23 of the actuating-pressure regulating valve 13. By virtue of the loading of the first measuring surface 23 of the actuating-pressure regulating valve 13, the actuating-pressure regulating valve 13 is held in the first end position represented in FIG. 2. The actuating-pressure chamber 12 is relieved into the tank volume 16 via the throttle 36 and via the relief line 15.

By reason of the increasing speed of the drive motor and the associated speed of the auxiliary pump 31, the pressure in the control-pressure supply line 28 or 28' increases. The position of the actuating-pressure regulating valve 13 remains unchanged until such time as the restoring spring 38 is compressed to such an extent by the control pressure acting on the piston face 37 in the control-pressure chamber of the control-pressure cylinder 32 that the valve lifter 39 acts on the second measuring surface 25 of the actuating-pressure regulating valve 13. Only from this pressure limit, which is capable of being set and to which a speed of the drive motor is assigned, does a further increase in pressure in the control-pressure supply line 28 or 28' bring about a displacement of the actuating-pressure regulating valve 13 in the direction of its second end position. In the event of a displacement of the actuating-pressure regulating valve 13 in the direction of its second end position, the actuating-pressure chamber 12 is connected to the delivery-side working line 3, and the hydraulic motor 1' is adjusted in the direction of smaller swash-plate angles.

If the position of the accelerator pedal is eased back by the driver and the speed of the prime mover is thereby reduced, the pressure in the control-pressure supply line 28 or 28' falls. In the process, the limiting value that is capable of being set by the restoring spring 38 is fallen short of, and the valve lifter 39 lifts away from the second measuring surface 25 of the actuating-pressure regulating valve 13. By reason of the elasticity of the compression spring 24 and also by reason of the pressure applied on the first measuring surface 23, the actuating-pressure regulating valve 13 returns to its first end position. In the process the actuating-pressure chamber 12 of the adjusting device is relieved, and the hydraulic motor 1' is adjusted in the direction of greater suction capacity.

The termination of the control process is therefore also capable of being set by the restoring spring 38, so that when still above the idling speed during the dropping of the speed of the drive shaft 5 the position of the actuating-pressure regulating valve 13 attains its first end position and the hydraulic motor 1 is adjusted by the available working pressure in the working line 3 in the direction of maximum suction capacity. As a result of the adjustment of the hydraulic motor 1 in the direction of maximum displacement, the braking power is improved considerably.

For the purpose of recycling leakage fluid flowing past the control-pressure piston 34, a further relief line 15" is provided which is connected to the tank volume 16 via the relief line 15. As is known from the state of the art, a switching valve 27 is provided, so that the pressure that is present in the control-pressure supply line 28 and that acts on the piston face 37 can be relieved by switching the switching valve 27 over to the tank volume 16.

A second exemplary embodiment of a hydraulic motor 1' according to the invention with speed-dependent control is represented in FIG. 3, wherein a mechanism for stroke limitation is additionally provided, with which an adjustment of the swash-plate angle to the maximum angle is prevented, in order consequently to counteract the stop-and-go effect described in the introduction. The working lines 3 and 4 are connected via a first connecting line 19 and a second connecting line 20, respectively, to a driving-direction valve 37', which in the exemplary embodiment is constructed as a 4/2-way valve. The driving-direction valve 37' exhibits a fourth port 38' which is connected to a feed line 39'. Furthermore, the hydraulic motor 1' has a variable stroke-limiting mechanism 40 acting on the actuating piston 8 of the adjusting device 7.

The stroke-limiting mechanism 40 comprises a stroke-limiting piston 41 which is loaded with a force in the direction of its piston face 43 by means of a compression spring 42. The pressure prevailing in a feed-pressure chamber 44 acts on the piston face 43 of the stroke-limiting piston 41. The feed-pressure chamber 44 is connected via the feed line 39' to the fourth port 38' of the driving-direction valve 37'. The driving-direction valve 37' is in turn constructed as a switching valve with two switching positions. In a first switching position the first connecting line 19 is connected to the working-pressure line 17 and the second connecting line 20 is connected to the feed line 39'.

Upon actuation of the electromagnet 22, which works against the force of a compression spring 21, the driving-direction valve 37' is brought into its second switching position. In the second switching position the first connecting line 19 is connected to the feed line 39' and the second connecting line 20 is connected to the working-pressure line 17.

The working lines 3 and 4 are connected to two check valves 48 and 49 via a third connecting line 46 and a fourth connecting line 47. The check valves 48 and 49 open in the direction of the third and fourth connecting lines 46 and 47. The third and fourth connecting lines 46 and 47 are connected to the cylinder chamber 11 via a common line section 50. The higher pressure of the two working lines 3 and 4 in the given case prevails in the cylinder chamber 11.

The control-pressure switching valve 27 together with the control-pressure cylinder 32 and the actuating-pressure regulating valve 13 correspond in structure and function to the above description with reference to FIG. 2.

In normal driving operation the working line 3 is pressurised by the hydraulic pump 2, for example, so that high pressure prevails in the delivery-side working line 3 and a low pressure prevails in the suction-side working line 4. Via the check valve 48 and the third connecting line 46 and also the line section 50, the cylinder chamber 11 is thereby pressurised with pressure medium from the delivery-side working line 3. Via the driving-direction valve 37' and the first connecting line 19, the working-pressure line 17 is likewise connected to the delivery-side working line 3. The feed-pressure chamber 44 is in communication with the suction-side working line 4 via the second connecting line 20, the driving-direction valve 37' and also the feed line 39'. The feed-pressure chamber 44 is pressureless. The compression spring 42 can thereby move the stroke-limiting piston 41 contrary to the slight residual pressure prevailing in the feed-pressure chamber 44. The stop 45 moves away from the actuating piston 8, and the actuating piston 8 can be freely adjusted both in the direction of large swash-plate angles α and in the direction of small swash-plate angles α. The setting of the swash-plate angle α is undertaken exclusively via the pressure ratios in the cylinder chamber 11 and in the actuating-pressure chamber 12. As already described above, in the actuating-pressure chamber 12 an actuating pressure is capable of being set which is capable of being set between the tank pressure and the pressure of the delivery-side working line 3. The actuating pressure is set on the basis of the forces acting on the measuring surfaces 23 and 25.

If the vehicle is travelling downhill, the pressure ratios in the working lines 3 and 4 are inverted. The previously suction-side working line 4 is pressurised by the hydraulic motor 1' driven by the wheels, which now acts as a pump, as a result of which the pressure prevailing therein becomes greater than that in the previously delivery-side working line 3. By virtue of the parallel arrangement of the two check valves 48 and 49, the higher of the two pressures of the working lines 3 and 4 in the given case prevails in the line section 50. When the vehicle is travelling downhill, the cylinder chamber 11 is thereby pressurised with pressure medium from the suction-side working line 4.

The driving-direction valve 37', on the other hand, is switched exclusively in a manner depending on the delivery direction of the hydraulic pump 2. As a result, in the actuating-pressure chamber 12 the pressure of the delivery-side working line 3 can be set to a maximum. By reason of the higher pressure prevailing in the cylinder chamber 11, a resultant force acts on the actuating piston 8, which moves the actuating piston 8 in the direction of the actuating-pressure chamber 12. The swash-plate angle α is thereby increasingly adjusted in the direction of greater displacement.

By virtue of the inversion of the pressure ratios in the working lines 3 and 4, the feed-pressure chamber 44 is connected via the feed line 39' to the previously suction-side working line 4 by virtue of the driving-direction valve 37'. Since in the case of pressure inversion the greater pressure prevails in the previously suction-side working line 4, also in the feed chamber 44 an elevated pressure is built up which acts on the piston face 43. As a result of the build-up of pressure, the piston 41 moves in the direction of the actuating piston 8, compressing the restoring spring 42.

The maximum traversed distance of the stroke-limiting piston 41 may, for example, be set to a particular swash-plate angle by a limiting mechanism which is not represented. The piston face 43 is larger than the first piston face 9 of the actuating piston 8, and an equally large pressure acts on both piston faces 9 and 43 from the suction-side working line 4, so that the actuating piston 8 can only be adjusted so far in the direction of large swash-plate angles until its motion is limited by the stop 45.

By virtue of the adjustment of the actuating piston 8 in the direction of large swash-plate angles α which is limited in this way, an overbraking of the vehicle, which would be followed by a re-acceleration, is prevented from occurring.

Once the end of a drive downhill has been reached, the pressure ratio of the two working lines 3 and 4 is again inverted. The pressure in the delivery-side working line 3 is therefore greater again than in the suction-side working line 4. The previously open check valve 49 closes, and the cylinder chamber 11 is again pressurised from the delivery-side working line 3. The feed-pressure chamber 44 continues to be connected to the suction-side working line 4, so that the pressure acting on the piston face 43 falls. The stroke-limiting piston 41 together with the stop 45 is therefore pushed back again into its initial position by the restoring spring 42. The possible travel distance of the actuating piston 8 again extends as far as the maximum possible swash-plate angle α.

In the event of a reversal of the driving direction, which is equivalent to an altered delivery direction of the hydraulic pump 2, the working line 4 becomes the delivery-side working line, and the working line 3 becomes the suction-side working line. At the same time, the driving-direction valve 37' is brought into its second switching position by actuation of the electromagnet 22.

The invention claimed is:

1. A hydraulic motor unit with a hydraulic motor (1') which is capable of being connected to two working lines (3, 4), the swash-plate angle (α) of the hydraulic motor (1') being capable of being adjusted by an adjusting device (7) which exhibits an actuating piston (8) with two piston faces (9, 10), the actuating pressure which acts on a first piston face (10) in an actuating-pressure chamber (12) being capable of being set by an actuating-pressure regulating valve (13), the actuating-pressure regulating valve (13) being capable of being adjusted between two end positions, and in a first actuating direction of the actuating-pressure regulating valve (13) an actuating force acts which is proportional to the pressure in a working line (3, 4), and in a second, opposite actuating direction of the actuating-pressure regulating valve (13) a control-pressure piston (34) acts with a force which is dependent on the control pressure only when a limiting value of a control pressure in a control-pressure supply line (28, 28') is exceeded, characterised in that for the purpose of setting a defined swash-plate angle (α) of the hydraulic motor (1') in the case of pressure inversion in the working lines (3, 4) the travel of the actuating piston (8) in the direction of large swash-plate angles is limited by a variable stroke-limiting mechanism (40) acting on the actuating piston (8).

2. Hydraulic motor unit according to claim 1, characterised in that the control-pressure piston (34) is loaded with the restoring force of a restoring spring (38).

3. Hydraulic motor unit according to claim 2, characterised in that the limiting value of the control pressure is capable of being set by the restoring force of the restoring spring (38) which counteracts the control pressure acting on a piston face (37) of the control-pressure piston (34).

4. Hydraulic motor unit according to claim 3, characterised in that the magnitude of the control pressure acting on the piston face (37) depends upon the speed of the prime mover.

5. Hydraulic motor unit according to one of claims 1 to 4, characterised in that the variable stroke-limiting mechanism (40) is capable of being actuated hydraulically by a pressure on a stroke-limiting piston (41) in a feed-pressure chamber (44).

6. Hydraulic motor unit according to claim 5, characterised in that the maximum available pressure for the adjusting device (7) is drawn by a driving-direction valve (18, 37') from the working line (3, 4) that is loaded with high pressure.

7. Hydraulic motor unit according to claim 6, characterised in that the feed-pressure chamber (44) is connected via the driving-direction valve (37') to the working line (3, 4) that is loaded with low pressure.

8. Hydraulic motor unit according to claim 5, characterised in that the maximum traversed distance of the stroke-limiting piston (41) is capable of being set permanently by a stop.

9. Hydraulic motor unit according to claim 5, characterised in that the stroke-limiting piston (41) is loaded by a compression spring (42) with a force contrary to the pressure prevailing in the feed-pressure chamber (44).

10. Hydraulic motor unit according to claim 1, characterised in that a piston face (9) of the actuating piston (8) acting contrary to the actuating pressure is connected in the given case to that working line (3, 4) in which, the greater pressure prevails.

11. Hydraulic motor unit according to claim 1, characterised in that the pressure in the working line (3, 4) acts on a first measuring surface (23) of the actuating-pressure regulating valve (13), and the actuating-pressure piston (34) acts on a second measuring surface (25) of the actuating-pressure regulating valve (13).

* * * * *